Jan. 8, 1929.　　　　G. L. LJUNGLOF　　　　1,698,057
OPTICAL INSTRUMENT
Filed Sept. 8, 1925
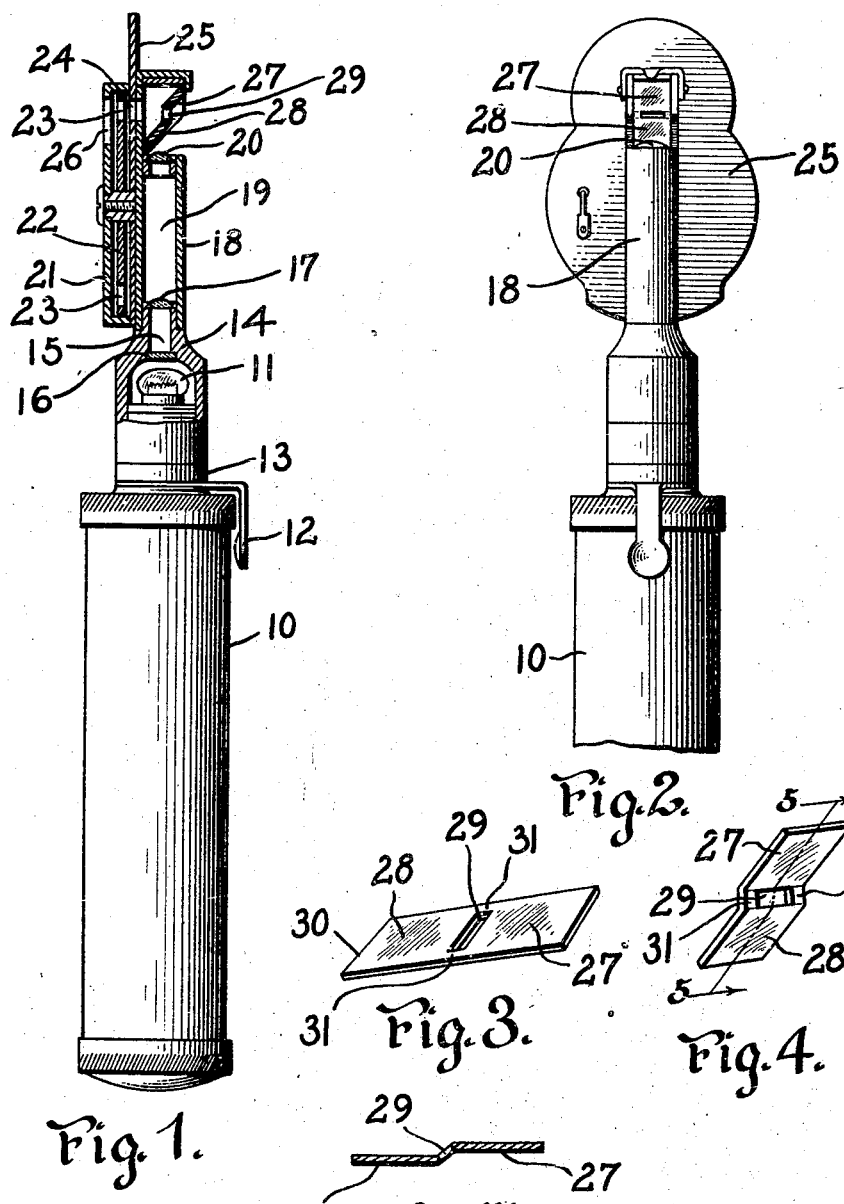
Inventor
George L. Ljunglof
By Harry H. Styll
Attorney Patented Jan. 8, 1929.

1,698,057

UNITED STATES PATENT OFFICE.

GEORGE L. LJUNGLOF, OF NEW YORK, N. Y., ASSIGNOR TO AMERICAN OPTICAL COMPANY, OF SOUTHBRIDGE, MASSACHUSETTS, A VOLUNTARY ASSOCIATION OF MASSACHUSETTS.

OPTICAL INSTRUMENT.

Application filed September 8, 1925. Serial No. 55,016.

This invention relates to new and useful improvements in optical instruments, and has particular reference to a new and novel construction of reflecting means for directing light to an object.

Certain types of diagnostic instruments, such as ophthalmoscopes and retinoscopes, comprise an angularly disposed reflector to direct rays of light from a light source to an object, said reflectors having a sight opening through which the operator observes the object thus illuminated. It is of prime importance that such reflectors must project a solid mass of light without a dark center in order that a true reflex may be had in eye testing.

Therefore, in the manufacture of various types of ophthalmoscopes and other optical instruments there has been employed means for directing light to an object, said means consisting of two small reflecting mirrors or surfaces positioned at an angle to the optical axis of the light source, and being offset slightly with respect to one another to form a sight opening therebetween. This reflector has not proven entirely satisfactory, however, as it is a very tedious and difficult operation to accurately assemble the two reflecting surfaces so that they will be in proper relationship to each other, the resultant cost of the reflector being very high.

It is, therefore, the purpose of the present invention to produce an improved construction whereby the above mentioned difficulties will be avoided.

The primary object of the present invention is to provide improved reflecting means of the character stated, which is of a superior type than has heretofore been produced.

Another object of the present invention is to provide improved reflecting means for use in connection with various optical instruments wherein said reflecting means comprises two reflecting surfaces formed from a single blank of material.

Another object is to provide improved reflecting means of the character stated having a pair of reflecting surfaces formed from a single blank of material, and being offset with respect to one another to form a sight opening therebetween.

Another object is to provide improved reflecting means which is so constructed that it may be quickly and easily assembled in connection with the optical instrument with which it is to be used, thereby obviating the former tedious and difficult assembling operation.

Another object is to provide improved reflecting means of the character stated wherein the two reflecting surfaces are so formed that they will be in proper relationship to each other before being assembled in the optical instrument.

Other objects and advantages of the invention will become more readily apparent during the course of the following description when taken in connection with the accompanying drawings, wherein:

Figure 1 is a partial elevation, partial vertical sectional view of one type of ophthalmoscope showing the reflecting means embodying the invention.

Figure 2 represents a front view of Figure 1.

Figure 3 shows a blank of stock from which the improved reflecting means is formed.

Figure 4 is a perspective view of the improved reflecting means.

Figure 5 is a longitudinal sectional view on the line 5—5 of Figure 4.

Similar numerals of reference indicate corresponding parts throughout the several views in the drawing.

Referring to the drawings, there is shown one type of ophthalmoscope comprising a suitable handle 10, which is made hollow to contain a battery (not shown) of any desired type, from which latter suitable electrical connections extend to the incandescent electric light 11, whose action is controlled by a manually operated switch 12. The upper portion of the handle member is provided with a head 13, upon which is threaded the lower portion of the detachable member 14, which has a bore or passage 15 therethrough, at the bottom of which bore is the translucent member 16, while at the top of the passage is located the aligning condensing lens 17. Threaded upon the upper end of the detachable member 14 is the casing 18 having the passage 19 therein, at the upper portion of which is located the condensing lens 20, the elements 16, 17 and 20 being in vertical alignment.

The upper end portion of the casing 18 carries the housing 21, within which is contained the rotatable apertured disc 22 of the conventional type, having ports 23 therein which can be turned into alignment with the port 24 of the stationary member 25.

The outer wall of the casing 21 has the slot 26 therein, which is in horizontal alignment with the ports 23 and 24. Further detail description of the above mentioned parts is considered unnecessary inasmuch as they have been shown and described merely for the purpose of illustration and do not constitute a portion of the present invention.

Located above the condensing lens 20 is the present improved reflecting means comprising an angularly disposed mirror having the two reflecting surfaces 27 and 28 which are slightly offset with respect to one another to form the sight opening 29 through which the object may be viewed, and which is in line with the ports 23 and 24 and the slot 26, said reflector directing the light at approximately right angles to the optical axis of the lens 20.

As stated herein above, the two reflecting surfaces 27 and 28 are formed from a single blank of stock, as shown in Figure 3. After the blank 30 has been cut from the stock, it is slotted approximately intermediate its ends to form the sight opening 29 when the reflecting means has been completed and assembled in connection with the instrument. One side of the blank 30 is then polished to provide the reflecting surfaces 27 and 28, the said blank then being bent, as shown in Figures 4 and 5, immediately adjacent each side of the sight opening 29 so that the said reflecting surfaces 27 and 28 will be slightly offset from one another. These surfaces are connected together by means of the webs 31 which are positioned at each end of the said sight opening.

It can readily be appreciated from the above that reflecting means of this character can be readily and cheaply made and that the assembling of the same in connection with the instrument can be much more easily and quickly accomplished than has been the case in the past since the proper bending of the blank 30 is sure to bring the two reflecting surfaces into proper relationship to one another.

It will now be apparent that I have devised a novel and useful reflecting means, which embodies the features of advantage enumerated as desirable in the statement of the invention set forth above, and that the reflecting surfaces are disposed in non-aligning planes to provide a sight opening therebetween with the upper edge of the lower reflecting surface suitably positioned with respect to the lower edge of the upper reflecting surface to prevent the light rays from the light source passing through said sight opening, as will be evident.

It will be understood that my invention is adapted for use on any optical instrument wherein reflecting means of this character is employed, and that in the drawings I have shown by way of illustration, the same as applied to one form of ophthalmoscope, although the device may be used in any type of ophthalmoscope, and that the invention is also adapted for use in connection with other optical instruments and that the arrangement of parts may be varied and changes may be made in the construction which will fall within the spirit of my invention, and I do not, therefore, desire to be limited to the exact details of construction hereinabove shown and described.

Having thus described my invention, what I claim is:

1. In a device of the character described a support having a sight opening, an inclined reflector carried by the support and having its two end portions lying in separated planes joined by a perforated intermediate portion said perforation being aligned with the sight opening in the support and means carrying a source of illumination secured to the support in a position whereby light from the source of light will be directed onto the reflector.

2. In a device of the character described a support having a sight opening, an inclined reflector carried by the support and having its two end portions lying in separated and substantially parallel planes joined by a perforated intermediate portion said perforation being aligned with the sight opening in the support and means carrying a source of illumination secured to the support in a position whereby light from the source of light will be directed on the reflector whence it will be reflected in line with the axial line through the aligned sight opening of the support and perforation of the reflector.

GEORGE L. LJUNGLOF.